United States Patent [19]

Sternlieb et al.

[11] Patent Number: 5,737,813
[45] Date of Patent: Apr. 14, 1998

[54] METHOD AND APPARATUS FOR STRIPED PATTERNING OF DYED FABRIC BY HYDROJET TREATMENT

[75] Inventors: Herschel Sternlieb, Brunswick, Me.; Frank E. Malaney, Charlotte; J. Steve Hines, Gastonia, both of N.C.

[73] Assignee: International Paper Company, Purchase, N.Y.

[21] Appl. No.: 804,823

[22] Filed: Feb. 24, 1997

Related U.S. Application Data

[63] Continuation-in-part of Ser. No. 381,282, Jan. 5, 1995, Pat. No. 5,632,072, which is a continuation of Ser. No. 190,765, Feb. 2, 1994, abandoned, which is a continuation of Ser. No. 660,753, Feb. 25, 1991, abandoned, which is a continuation-in-part of Ser. No. 411,491, filed as PCT/US89/01585, Apr. 14, 1989, Pat. No. 4,995,151, and Ser. No. 181,284, Apr. 14, 1988, Pat. No. 4,960,630.

[51] Int. Cl.$^6$ ............................ D06B 1/02; D06C 23/00
[52] U.S. Cl. ................................ 28/167; 28/163; 28/168; 8/151; 68/205 R
[58] Field of Search .............................. 28/167, 163, 168, 28/169, 105, 104, 160; 26/69 R; 8/151, 149.1; 68/205 R

[56] References Cited

U.S. PATENT DOCUMENTS

| Re. 31,601 | 6/1984 | Ikeda et al. ........................ 428/93 |
| 2,241,222 | 5/1941 | Sonnino ........................... 26/2 |
| 2,862,251 | 12/1958 | Kalwaites ........................ 19/161 |

(List continued on next page.)

FOREIGN PATENT DOCUMENTS

| 287821 | 12/1988 | Australia . |
| 739652 | 8/1966 | Canada . |
| 4386/85 | 3/1986 | Denmark . |
| 0 099 639 | 2/1984 | European Pat. Off. . |
| 0177277 | 4/1986 | European Pat. Off. . |
| 0210777 | 2/1987 | European Pat. Off. . |
| 0215684 | 3/1987 | European Pat. Off. . |
| 0228197 | 7/1987 | European Pat. Off. . |
| 853707 | 3/1986 | Finland . |
| 2265891 | 3/1974 | France . |
| 36-8145 | 6/1961 | Japan . |
| 46-9876 | 3/1971 | Japan . |
| 54-11433 | 5/1979 | Japan . |
| 57-35051 | 2/1982 | Japan . |
| 61-6368 | 1/1986 | Japan . |
| 61-55253 | 3/1986 | Japan . |
| 61-252339 | 11/1986 | Japan . |
| 61-58573 | 12/1986 | Japan . |
| 62-28466 | 2/1987 | Japan . |
| 62-55253 | 3/1987 | Japan . |
| 62-69866 | 3/1987 | Japan . |
| 62-149961 | 7/1987 | Japan . |
| 63-303173 | 12/1988 | Japan . |

(List continued on next page.)

OTHER PUBLICATIONS

Kenneth R. Randall, "Hydroentanglement Technology for Wet-Laid Applications", *Nonwovens World*, pp. 28–31, Mar., 1989.

*Primary Examiner*—Amy B. Vanatta
*Attorney, Agent, or Firm*—Ostrager, Chong & Flaherty

[57] ABSTRACT

Striped patterning of dyed fabric, particularly dyed denim, is obtained by impacting the fabric with a row of columnar jet streams of fluid generated from a manifold under pressure while conveying it on a support member in a machine direction through a patterning station. The orifice gauge and diameter, manifold pressure, and line speed are selected to obtain optimal striping without blurring, loss of fabric strength or durability, or excessive warp shrinkage. Preferably, the jet strip is removably interchangeable in a common hydrojet manifold for forming different kinds of striped patterns. The back side of denim fabric may be subjected to pre-treatment to cause the surface of the dyed warp side to fill in and darken with color. A strié striping effect can also be obtained using a combination of jet strips. The striped patterning station can be incorporated at any suitable point in a conventional denim finishing range.

20 Claims, 6 Drawing Sheets

U.S. PATENT DOCUMENTS

| | | | |
|---|---|---|---|
| 2,981,999 | 5/1961 | Russel | 28/1 |
| 3,010,179 | 11/1961 | Thal | 28/72 |
| 3,033,721 | 5/1962 | Kalwaites | 154/46 |
| 3,081,515 | 3/1963 | Griswold et al. | 28/78 |
| 3,088,859 | 5/1963 | Smith | 28/106 X |
| 3,113,349 | 12/1963 | Nottebohm et al. | 19/161 |
| 3,157,633 | 11/1964 | Khun et al. | 260/200 |
| 3,214,819 | 11/1965 | Guerin | 28/72.2 |
| 3,256,581 | 6/1966 | Thal et al. | |
| 3,333,315 | 8/1967 | Dyer et al. | 28/72.2 |
| 3,403,862 | 10/1968 | Dworjanyn | 239/566 |
| 3,422,510 | 1/1969 | Livingston et al. | 28/1 |
| 3,434,188 | 3/1969 | Summers | 28/72.2 |
| 3,443,878 | 5/1969 | Weber et al. | |
| 3,449,809 | 6/1969 | Shin | 28/72.2 |
| 3,458,905 | 8/1969 | Dodson, Jr. et al. | 19/161 |
| 3,485,706 | 12/1969 | Evans | 161/72 |
| 3,485,708 | 12/1969 | Ballou et al. | 161/72 |
| 3,485,709 | 12/1969 | Evans et al. | 161/109 |
| 3,486,168 | 12/1969 | Evans et al. | 161/169 |
| 3,493,462 | 2/1970 | Bunting, Jr. et al. | 161/169 |
| 3,494,821 | 2/1970 | Evans | 161/169 |
| 3,498,874 | 3/1970 | Evans et al. | 161/109 |
| 3,508,308 | 4/1970 | Bunting, Jr. et al. | 28/72.2 |
| 3,523,346 | 8/1970 | Bolen et al. | 26/28 |
| 3,531,363 | 9/1970 | Shambeian | 161/72 |
| 3,537,945 | 11/1970 | Summers | 428/292 X |
| 3,542,632 | 11/1970 | Eickhoff | 161/65 |
| 3,546,755 | 12/1970 | Lynch | 28/72.2 |
| 3,560,326 | 2/1971 | Bunting, Jr. et al. | 161/169 |
| 3,574,106 | 4/1971 | Bragg | 428/91 |
| 3,613,186 | 10/1971 | Mazzone et al. | 26/69 R |
| 3,616,175 | 10/1971 | Jung | 161/164 |
| 3,620,903 | 11/1971 | Bunting, Jr. et al. | 161/169 |
| 3,635,625 | 1/1972 | Voss | 425/135 |
| 3,667,258 | 6/1972 | Newton | 28/218 |
| 3,681,182 | 8/1972 | Kalwaites | 28/105 |
| 3,682,756 | 8/1972 | Kalwaites | 28/105 |
| 3,688,355 | 9/1972 | Okzaki et al. | 28/1.4 |
| 3,707,746 | 1/1973 | Summers | 28/72.2 |
| 3,747,161 | 7/1973 | Kalwaites | 19/161 |
| 3,750,236 | 8/1973 | Kalwaites | |
| 3,750,237 | 8/1973 | Kalwaites | 19/161 P |
| 3,768,121 | 10/1973 | Kalwaites | 19/161 P |
| 3,769,659 | 11/1973 | Kalwaites | 19/161 P |
| 3,787,932 | 1/1974 | Kalwaites | 19/161 P |
| 3,800,364 | 4/1974 | Kalwaites | 19/161 P |
| 3,837,046 | 9/1974 | Kalwaites | 19/161 P |
| 3,873,255 | 3/1975 | Kalwaites | 425/83 |
| 3,906,130 | 9/1975 | Tsurumi et al. | |
| 3,917,785 | 11/1975 | Kalwaites | 264/108 |
| 3,960,485 | 6/1976 | Fantl et al. | |
| 3,967,470 | 7/1976 | Miura et al. | |
| 4,005,230 | 1/1977 | Fleissner | 28/169 |
| 4,023,526 | 5/1977 | Ashus et al. | |
| 4,024,612 | 5/1977 | Contractor et al. | 28/72.2 F |
| 4,069,563 | 1/1978 | Contractor et al. | 28/105 |
| 4,085,485 | 4/1978 | Brandon et al. | 28/104 |
| 4,099,913 | 7/1978 | Walter et al. | |
| 4,109,353 | 8/1978 | Mitchell et al. | |
| 4,124,428 | 11/1978 | Forest | |
| 4,141,231 | 2/1979 | Kudlich | 68/205 R |
| 4,144,370 | 3/1979 | Boulton | 428/233 |
| 4,145,468 | 3/1979 | Mizoguchi et al. | 428/239 |
| 4,146,663 | 3/1979 | Ikeda et al. | 428/96 |
| 4,152,480 | 5/1979 | Adachi et al. | 428/227 |
| 4,156,957 | 6/1979 | McKay | 28/159 |
| 4,167,600 | 9/1979 | Benzaquen | 428/91 |
| 4,190,695 | 2/1980 | Niederhauser | 428/92 |
| 4,228,123 | 10/1980 | Marshall | 264/557 |
| 4,233,349 | 11/1980 | Niederhauser | 428/92 |
| 4,251,587 | 2/1981 | Mimura et al. | 428/233 |
| 4,277,266 | 7/1981 | Dick | |
| 4,290,766 | 9/1981 | Burns, Jr. et al. | 8/491 |
| 4,323,760 | 4/1982 | Greenway et al. | |
| 4,329,763 | 5/1982 | Alexander et al. | 28/104 |
| 4,364,156 | 12/1982 | Greenway et al. | |
| 4,368,227 | 1/1983 | Setsuie et al. | 428/91 |
| 4,379,799 | 4/1983 | Holmes | 28/104 X |
| 4,393,562 | 7/1983 | Stokes | 26/69 R |
| 4,410,579 | 10/1983 | Johns | 428/131 |
| 4,418,451 | 12/1983 | Stokes | |
| 4,426,420 | 1/1984 | Likhyani | 428/224 |
| 4,426,421 | 1/1984 | Nakamae et al. | 428/234 |
| 4,442,161 | 4/1984 | Kirayoglu et al. | 428/219 |
| 4,453,298 | 6/1984 | Nabulon et al. | 28/255 |
| 4,471,514 | 9/1984 | Stokes | |
| 4,497,095 | 2/1985 | Minemura et al. | 26/2 R |
| 4,499,637 | 2/1985 | Greenway | 26/2 R |
| 4,562,097 | 12/1985 | Walter et al. | |
| 4,578,845 | 4/1986 | Young, Jr. | |
| 4,582,666 | 4/1986 | Kenworthy et al. | 264/557 |
| 4,591,513 | 5/1986 | Suzuki et al. | 427/200 |
| 4,612,237 | 9/1986 | Frankenburg | 428/219 |
| 4,647,490 | 3/1987 | Bailey et al. | 428/131 |
| 4,665,597 | 5/1987 | Suzuki et al. | 28/104 |
| 4,691,417 | 9/1987 | Vuillaume | 28/105 |
| 4,693,922 | 9/1987 | Buyofski et al. | 28/105 X |
| 4,695,422 | 9/1987 | Curro et al. | 264/504 |
| 4,695,500 | 9/1987 | Dyer et al. | 428/134 |
| 4,718,152 | 1/1988 | Suzuki et al. | 28/104 |
| 4,742,589 | 5/1988 | Sando et al. | 8/151 |
| 4,743,483 | 5/1988 | Shimizu et al. | 428/89 |
| 4,767,584 | 8/1988 | Siler | 425/385 X |
| 4,805,275 | 2/1989 | Suzuki et al. | 2/89 |
| 4,808,467 | 2/1989 | Suskind et al. | 428/284 |
| 4,828,174 | 5/1989 | Love, III | |
| 4,845,790 | 7/1989 | Brasington | 68/205 R |
| 4,863,775 | 9/1989 | Jacobs et al. | 28/163 |
| 4,934,008 | 6/1990 | Taylor | 8/151 |
| 4,960,630 | 10/1990 | Greenway et al. | |
| 4,967,456 | 11/1990 | Sternleib et al. | |
| 4,995,151 | 2/1991 | Siegel et al. | 26/69 |
| 5,023,130 | 6/1991 | Simpson et al. | 428/227 |
| 5,033,143 | 7/1991 | Love, III | |
| 5,037,692 | 8/1991 | Miyazaki et al. | 428/252 |
| 5,047,276 | 9/1991 | Chomarat et al. | |
| 5,080,952 | 1/1992 | Willbanks | 428/91 |
| 5,115,544 | 5/1992 | Widen | 28/105 |
| 5,136,761 | 8/1992 | Sternleib et al. | |
| 5,142,753 | 9/1992 | Bolliand et al. | 28/167 |
| 5,173,360 | 12/1992 | Hiroe et al. | 428/229 |
| 5,217,796 | 6/1993 | Kasai et al. | 428/229 |
| 5,235,733 | 8/1993 | Willbanks et al. | 28/105 |
| 5,292,573 | 3/1994 | Adams, Jr. et al. | 428/196 |
| 5,337,460 | 8/1994 | Cockfield et al. | 28/167 |
| 5,405,684 | 4/1995 | Cockfield et al. | 428/229 |
| 5,475,905 | 12/1995 | Cockfield et al. | 28/16 |

FOREIGN PATENT DOCUMENTS

| | | |
|---|---|---|
| 81218 | 3/1986 | Portugal . |
| 1015499 | 11/1963 | United Kingdom . |
| 952819 | 3/1964 | United Kingdom . |
| 978452 | 12/1964 | United Kingdom . |
| 1063252 | 3/1967 | United Kingdom . |
| 1101899 | 1/1968 | United Kingdom . |
| 1380071 | 1/1975 | United Kingdom . |
| 1515455 | 6/1978 | United Kingdom . |
| 2 047 291 | 11/1980 | United Kingdom . |
| 89/09850 | 10/1989 | WIPO . |
| 89/10441 | 11/1989 | WIPO . |

METHOD AND APPARATUS FOR STRIPED PATTERNING OF DYED FABRIC BY HYDROJET TREATMENT

RELATED APPLICATIONS

This patent application is a continuation-in-part of U.S. patent application Ser. No. 08/381,282, filed Jan. 5, 1995, now U.S. Pat. No. 5,632,072 which was a continuation of U.S. patent application Ser. No. 08/190,765 filed on Feb. 2, 1994, now abandoned, which was a continuation of U.S. patent application Ser. No. 07/660,753 filed on Feb. 25, 1991, now abandoned, which was a continuation-in-part of U.S. patent application Ser. No. 07/411,491 filed on Jul. 17, 1989, issued as U.S. Pat. No. 4,995,151, which was an application under 35 U.S.C. §371 from PCT International Application US89/01585, filed Apr. 14, 1989, and a continuation-in-part of U.S. patent application Ser. No. 07/181,284 filed on Apr. 14, 1988, issued as U.S. Pat. No. 4,960,630, said applications having a common inventor with the present application.

FIELD OF INVENTION

This invention relates to a method and apparatus for producing striped patterning on dyed fabric by hydrojet treatment. More particularly, it concerns striped patterning of dyed denim fabric via a patterning station included in a denim finishing range.

BACKGROUND ART

Hydrojet treatment has been developed for patterning and/or enhancing the surface finish, texture, durability, and other characteristics of woven or knit, spun or filament yarn fabric. Hydrojet treatment generally involves exposing one or both surfaces of a conveyed fabric to the downward impact of one or more rows of fluid jets, followed by removal of moisture from the fabric and drying. For example, U.S. Pat. No. 4,995,151 to Siegel et al., which is commonly owned by International Paper Company, and has copendency and a common inventor herewith, discloses producing patterned denim fabric by impacting a continuous curtain of fluid against the fabric supported on an underlying patterned support surface having a pattern of raised and lowered or void areas. Dye is washed out from the impacted raised areas and tends to become concentrated in the lowered areas defined by the patterned support surface such that a corresponding dye washout pattern is produced in the fabric. For a further description thereof, the contents of U.S. Pat. No. 4,995,151 are incorporated herein by reference.

Other proposals have been made for patterning napped fabric by impacting with hydrojets to form textured or compacted napped areas on the fabric in a desired pattern. For example, U.S. Pat. No. 4,743,483 to Shimizu discloses producing striped or wavy lines or other patterns in napped fabric by controlling a spinneret row of high-pressure jet streams such that the naps in the impacted areas become reversed and tightly entangled in the base layer.

Published European Patent Application 0,177,277 of Willbanks et al. describes patterning or texturing woven or knitted or pile fabrics by controlling a fixed nozzle array with individual electronic, pneumatic, or mechanical controls. Different patterns, including striped patterns, can be produced by turning appropriate nozzle controls on or off, or having their fluid streams passed or deflected according to the desired pattern.

The present invention resides in the discovery of an improved technique for striped patterning of dyed fabric through hydrojet treatment. It is found that striped patterning of dyed fabric can be obtained without the need for a patterned support surface underlying the fabric. In particular, striped patterns of a high contrast and clarity can be produced in denim fabric without blurring, loss of fabric strength or durability, or excessive warp shrinkage. Different striped patterns can also be readily produced without the high cost and complexity of using pattern-controlled nozzles.

SUMMARY OF THE INVENTION

In the present invention, striped patterning of dyed fabric is obtained by impacting the fabric with columnar jet streams of fluid under pressure while conveying it on a support member in a machine direction in order to form striped areas in the fabric by color washout of dye. The columnar jet streams are supplied from a row of orifices arranged in a hydrojet manifold across the width of the fabric. The jet strips have a selected gauge of orifice spacing, orifice diameter, are emitted under a selected pressure, and are removably interchangeable in a common hydrojet manifold for producing different kinds of striped patterns. Color washout of dye in the striped areas produces a striped patterning effect without blurring, loss of fabric strength or durability, or excessive warp shrinkage.

A high-quality striped patterning effect can be produced in dyed denim fabric by impacting the dyed warp side of the fabric with jet streams of selected gauge, size, and pressure. The degree of color washout, clarity of stripes, and softness of the resulting fabric are related to the type of dye in the fabric and the amount and manner of fluid impact energy applied to the fabric. Particularly good results are obtained with blue overdyed denim (sulfur overdye on indigo cotton denim).

As a variation of the striped patterning technique, the back side of denim fabric may be subjected to pre-treatment by overall color washout causing the surface of the dyed warp side to fill in and darken with color. When the dyed warp side is then subjected to striped patterning treatment, the stripes produced contrasted with the darker color of the dyed warp side more distinctly.

Another variation of the striped patterning technique is the use of a combination of jet strips which have different orifice sizes and/or gauge and/or are operated at a higher line speed or lower pressure in order to produce a background striping (referred to as "strié") in the dyed fabric.

The jet strips may be interchanged in a common hydrojet manifold structure in order to obtain different striped patterning effects in dyed fabrics. Other types of dyed fabrics may be treated besides denim. Multiple manifolds or jet strips having multiple orifice rows may be used under certain conditions to deliver higher fluid impact energies for color washout of dye. The striped patterning station may be used separately or incorporated at a suitable point in a denim finishing range.

Other objects, features and advantages of the present invention will be apparent from the detailed description below of the preferred embodiments of the invention, considered in conjunction with the following drawings:

DETAILED DESCRIPTION OF THE INVENTION

In the present invention, striped patterning of dyed fabric is produced by hydrojet treatment with jet strips selectively configured to obtain an optimal striped patterning on the surface of the fabric by color washout of dye. In the described embodiments below, the hydrojets emit columnar jet streams of water under high pressure from a manifold against the dyed surface of denim fabrics to obtain a desired striped patterning thereon. However, it is understood that the principles of the invention may be applied as well to other types of dyed fabric, and may employ other non-caustic fluids besides water.

Figure 1:
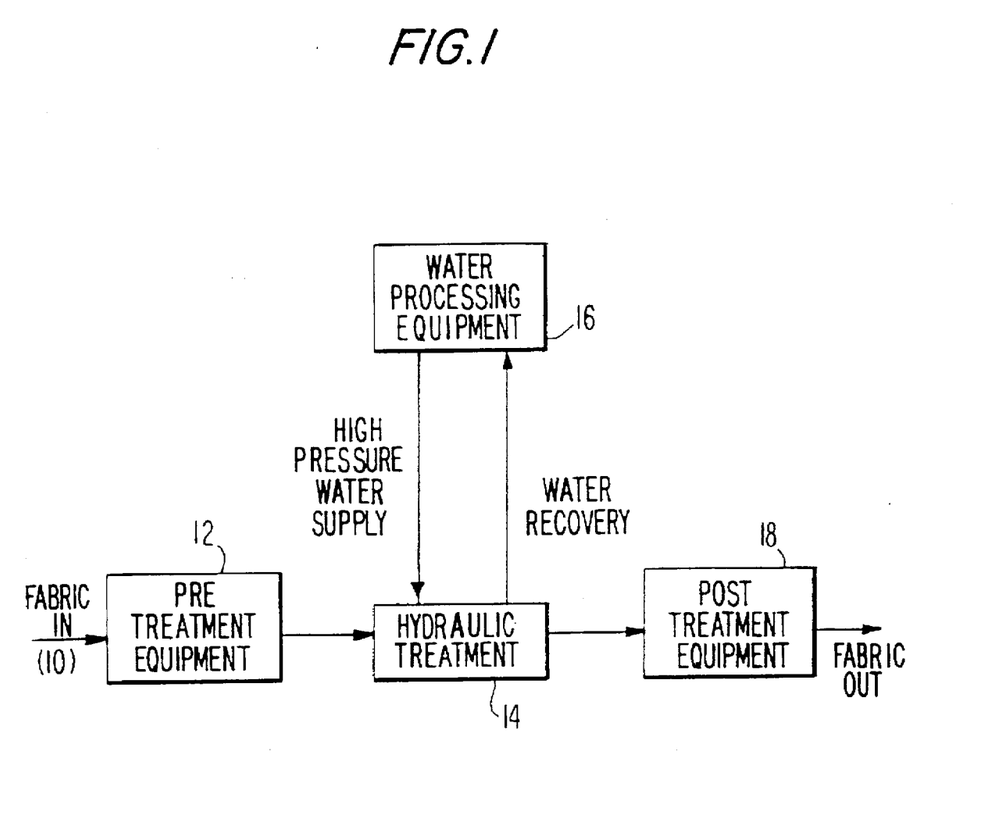
FIG. 1 is a schematic diagram of the overall process for hydrojet treatment of dyed fabric to produce striped patterning in accordance with the invention.

Referring to the general process steps of the invention as illustrated in FIG. 1, incoming fabric 10 is subjected to any desired fabric pre-treatment at block 12, such as desizing, singeing, or pre-tentering for denim fabric. Desizing is employed to remove some stiffness from the starting fabric in a loom state. Singeing removes surface fiber hair. Pre-tentering is used to stretch the fabric to a predetermined width in excess of the desired finished width in order to compensate for the expected shrinkage from the hydraulic treatment process.

The pre-treated fabric is subjected to hydrojet treatment at a patterning station designated at block 14 provided with a high pressure water supply and water recovery through associated water processing equipment 16. The patterned fabric is then subjected to any desired post-treatment indicated at block 18, such as post-tentering, padding, and drying to obtain the finished product. Post-tentering is used to stretch the fabric after hydraulic treatment by a slight amount to the exact desired finished width. Padding is used to apply softening agents to the hydraulically treated fabric.

In the present invention, striped patterning is produced in dyed fabric by color washout of dye. The dyeing of fabric is deemed to be well known to those skilled in the art. The type of dyestuff and method of dyeing plays an important role in the patterning effect to be obtained. For dyed denim, indigo dye is preferred for its surface or layered characteristic, which produces patterned effects by the removal of dye from the surface of the yarns in discrete areas. Indigo dye is typically applied by passing yarns from a warp beam through a series of 5 to 8 dye baths to form a number of dye coats on the surface of the fibers. A sulfur overdye can be applied on indigo dyed denim to obtain a more distinctive patterning effect, as described further below.

Figure 2:
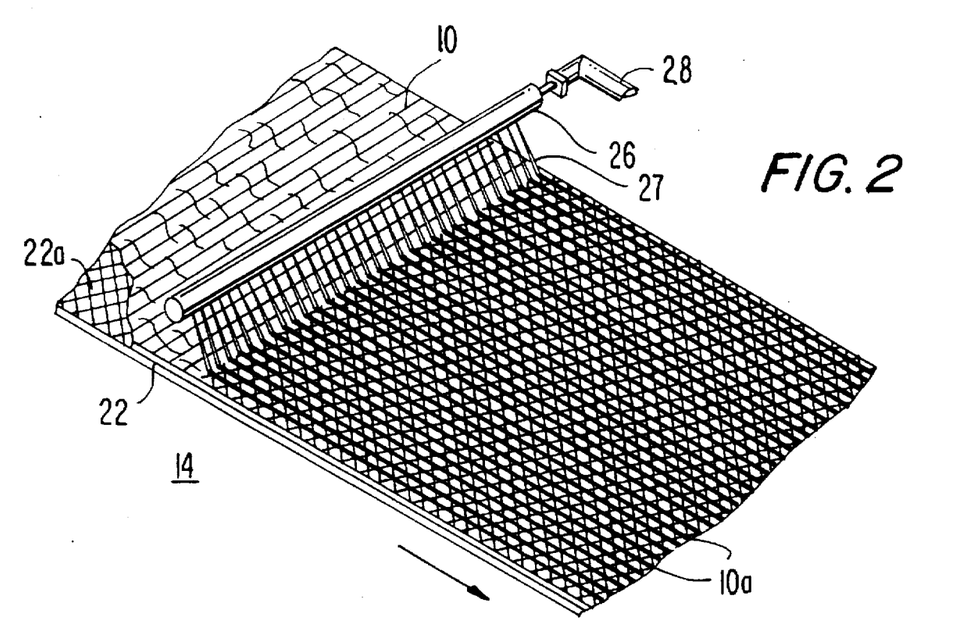
FIG. 2 shows a preferred embodiment of a striped patterning station having multiple in-line manifolds arranged over a flat-bed conveyor.

In FIG. 2, a preferred form of striped patterning apparatus 14 has a hydrojet manifold 26 arranged in parallel extending in a cross direction over the width of the fabric 10 conveyed on a flat-bed conveyor 22 in a machine direction (arrow pointing downstream). The manifold 26 is supplied by a high-pressure water supply line 28. The conveyor 22 has a porous or solid support surface 22a for evenly supporting the back side of the fabric thereon. A porous support surface is preferred for sufficient drainage of water when large amounts of water are applied to the fabric. The porous support surface may be a conventional steel mesh or a plain weave screen formed of polyester warp and shute round filament. The manifold 26 has a high pressure plenum communicating with a jet strip provided with at least one row of orifices for emitting columnar fluid streams of water 27 downwardly to impact on the facing side of the fabric. The fabric 10 has striped areas 10a formed by color washout of dye as it exits from the downstream side of the striped patterning station 14.

Generally, the hydrojet manifold may be positioned in the range from 0.5 to 10 inches above the conveyor 22. The manifold water pressure forming the columnar streams 27 may be in the range from 200 to 2500 psi. The line speed for the conveyor may be in the range from 10 to 500 ft/min. The support surface 22a may be a wire mesh screen of fine mesh size, for example, 100×94 mesh having 28% open area, or a solid surface such as a metal or plastic conveyor belt.

The degree and nature of color washout obtained are dependent upon the impact energy applied to a particular fabric, the number and spacing of orifices in the jet strip, the diameter of the orifices, and the pressure of fluid in the manifold. For striped patterning of denim, the jet strip 48 is formed with a selected number of orifices per inch (referred to hereinafter as the gauge of the jet strip). The jet strip may have as few as 1 orifice per inch, or may have a large gauge number if dense striping or overall color washout is desired. It is found that a gauge number of 12 to 18 produces an aesthetic pinstriping effect desirable for denim. A gauge higher than 18 tends to produce more of an overall color washout less distinct stripes, and a gauge of about 61 is preferred for producing an even overall color washout of dye from the fabric. The striping effect can be muted or randomized (as described further herein) with a combination of gauges.

While the color washout effect for striping is greater at slower speeds due to the higher delivered impact energy per unit of time, the clarity of the stripes may be less distinct due to greater flooding of water on the fabric. At higher speeds, there is less color washout but a more even striping effect.

It is found that a larger orifice diameter will produce better stripe clarity and depth of patterning. For example, in striped patterning of denim, it is found that an orifice diameter of 0.005 inch using 1750 psi water pressure and line speed of 100 feet/min may be insufficient to produce noticeable striping, whereas striping effects become noticeable at larger orifice diameters of 0.007 inch, and definitely at 0.009 inch. Individual orifices having a large diameter of 0.011 to 0.013 inch or clusters of two or three smaller 0.005-inch orifices can equally produce striping of good clarity.

The amount of delivered impact energy can be increased by treatment in multiple passes or by using multiple manifolds or a jet strip with multiple rows of orifices. Since multiple passes can have difficulties in maintaining stripe registration, and use of multiple manifolds can result in de-registration due to interim fabric shrinkage, the use of multiple orifice rows in one manifold is preferred over multiple passes or manifolds.

Figure 3:
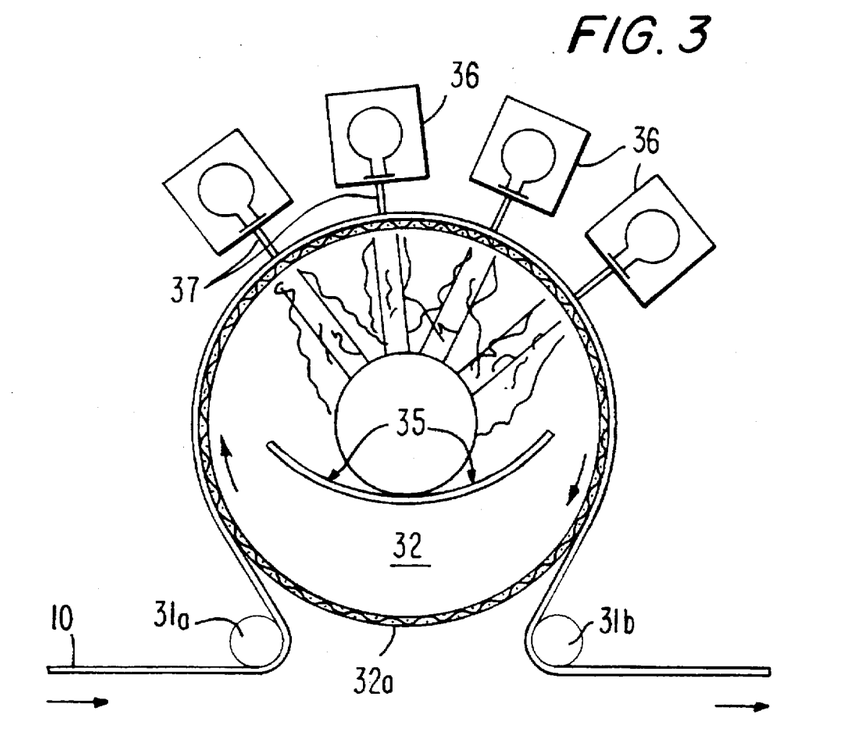
FIG. 3 shows another preferred embodiment of a striped patterning station having multiple manifolds arrayed around a cylindrical drum conveyor.

FIG. 3 shows another embodiment of the patterning station (in cross-section) having multiple (four) manifolds 36 arranged in close proximity at the upper part of the circumference of a cylindrical drum 32 as the conveyor. Each manifold has a row of jet orifices which directs columnar streams 37 against the fabric 10 advanced on the drum 32. The drum 32 has a porous support surface 32a, such as a wire mesh screen, extending around its cylindrical surface. The fabric 10 is entrained by rollers 31a, 31b to advance along with the turning direction of the drum 32. A water collector and vacuum pipe system 35 returns water drained from the fabric to a water recovery system having a filter to remove dislodged fibers and debris, settling tanks to remove washed out dye or pigment, and recirculating pump to return water under pressure to the manifolds 36.

Figure 4A:
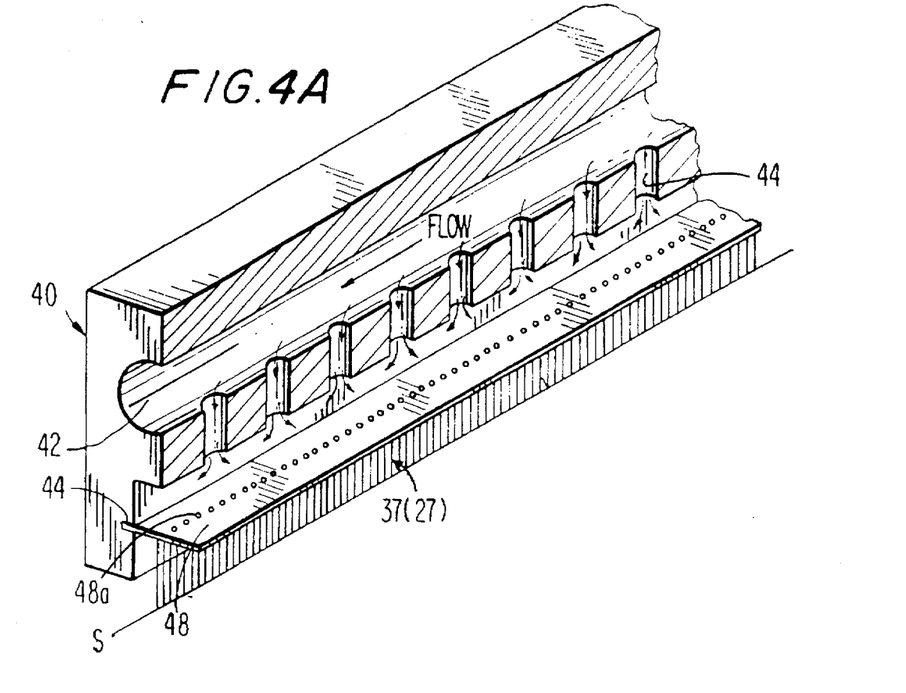
FIG. 4A is a perspective view in section and FIG. 4B is a cross-sectional view of a preferred embodiment of a hydrojet manifold employing a removable jet strip having a single row of orifices.
Figure 4B:
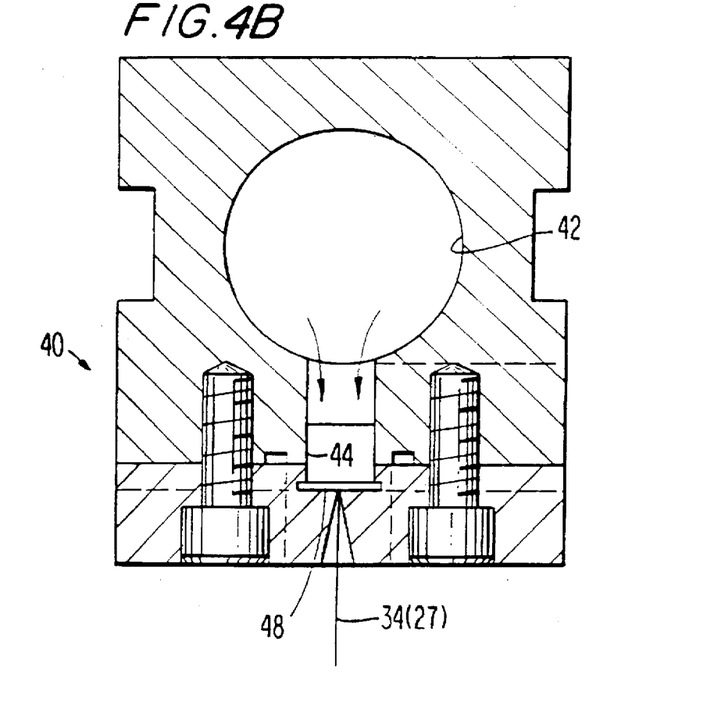

FIGS. 4A (perspective in section) and 4B (cross-sectional view) illustrate a preferred manifold structure 40 having removably interchangeable jet strips in accordance with the invention. The manifold 40 has a main plenum 42 through which high pressure water is directed and distributed through plenum holes 44. A jet strip 48 having a row of orifices 48a is slidably mounted in grooves 41 formed in the chamber walls of the manifold 40. Each orifice 48a emits a columnar jet 37 (27) from the exit side of the manifold 40. The mounting structure and interchanging of jet strips in a hydrojet manifold are well known in the industry, and are not described further herein. The use of removable jet strips allows different striped patterning effects to be readily obtained in different production runs.

Figure 6A:
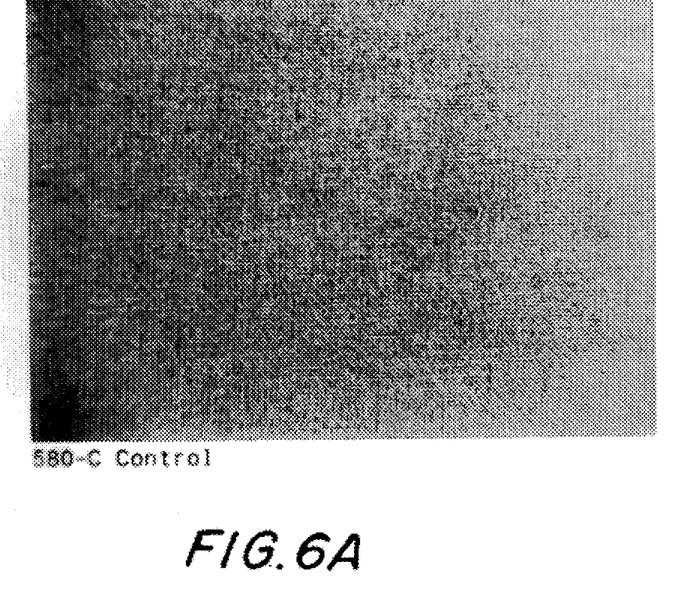
FIGS. 6A and 6B are photographs showing a control and a sample of denim fabric stripe-patterned in accordance with the present invention.
Figure 6B:
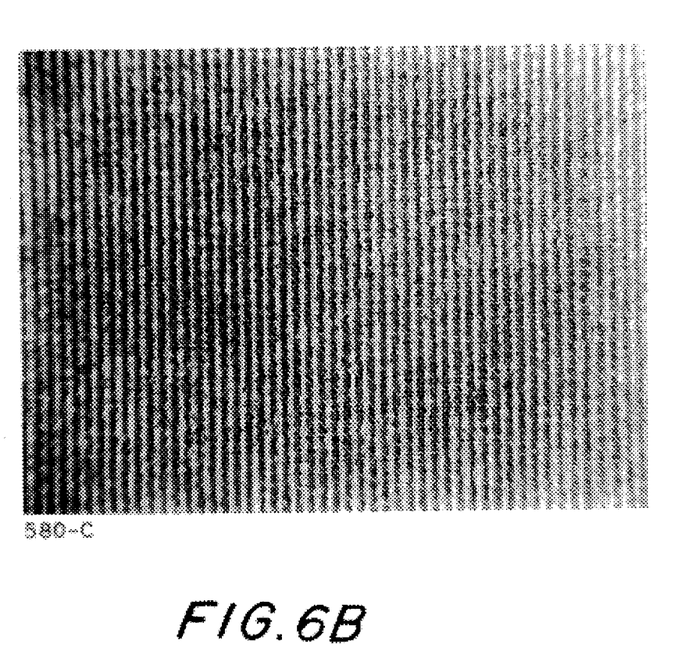

The appended Table I summarizes the results of comparative tests performed for striping of denim fabric. The fabric of Sample No. 1 was a blue overdyed denim with sulfur dye on 10.5 oz/yd$^2$ indigo cotton denim, and the fabric of Sample No. 2 was a black overdyed denim of similar dye and weight of denim. Striping was carried out with a 12-gauge jet strip with an orifice size of 0.013 inch, a pressure of 2200 psi and a line speed of 90 fpm. The resultant striped fabrics had good quality striping produced in the denim. The control and striped Sample Nos. 1A and 1B are shown in the photographs appended as FIGS. 6A and 6B.

Sample No. 1B was also tested for warp and weft tensile strength (standard tests ASTM D5035-90 and D2261-83), and Elmendorf tear strength (ASTM D1424-83), and the results thereof are listed on Table I as compared to the control Sample No. 1A without striped patterning treatment. The striped Sample 1B showed comparable tensile strength, and a tear strength reduced by only about 20%–40% as compared to the control fabric, which was within tolerance for a satisfactory product.

As also listed in Table I, the fabric of Sample Nos. 3A–6F was a 13 oz/yd$^2$ indigo cotton denim, and was tested for striping effects using different jet strip gauges, orifice sizes, and line speeds. Sample Nos. 3A and 3B were striped with a 12-gauge jet strip of 0.011 orifice size, pressure of 1750 psi, and line speed of 100 fpm. Visual inspection showed that good striping results were obtained. Sample 3B showed the striping was not noticeably affected after washing the fabric three times.

Sample Nos. 4A and 4B were striped with a 2-gauge jet strip of 0.005 orifice size, pressure of 1750 psi, and line speed of 100 fpm. Visual inspection showed that the striping obtained with small diameter orifices was somewhat faint. The striping was not substantially affected after three washings.

Sample Nos. 5A and 5B were striped with a 3-gauge jet strip of 0.005 orifice size, pressure of 1750 psi, and line speed of 100 fpm. Visual inspection showed that the striping somewhat faint, but not substantially affected after three washings.

Sample Nos. 6A–6F were striped with a 12-gauge jet strip of 0.011 orifice size, pressure of 1750 psi, and line speed of 50, 100, and 150 fpm. A very good pinstriping effect was produced which was durable after three washings. Visual inspection showed that operation at higher line speeds produced stripes which were thinner but more even.

The optimal jet strip gauge, orifice size, and fluid pressure depends upon the dye, fabric, and type of striping effect desired. Under comparable conditions, better results were obtained with lower-gauge, larger-diameter strips than with higher-gauge, smaller-diameter strips. However, too large an orifice diameter can produce too heavy a columnar stream and may weaken the fabric. Flooding the fabric so that water covers the facing side should be avoided since the water cushions the impact of the jet and reduces the stripe definition. If a solid support member is used, a surface water removal method such as vacuum suction is desired. Generally, the higher the jet pressure, the more dye removal is obtained. Also, the more impact energy applied, the softer the final fabric is. However, fluid pressures and impact energies that are too high may adversely affect the tear strength of the fabric.

Figure 7:
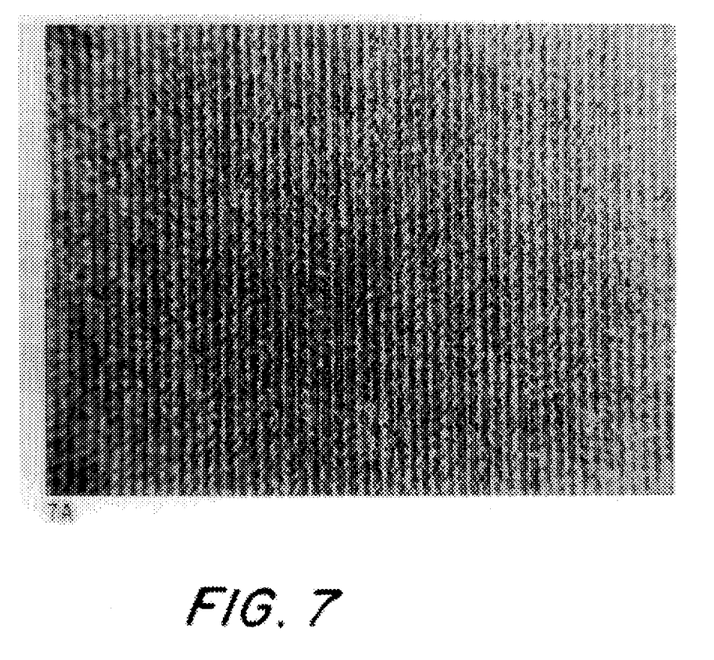
FIG. 7 is a photograph showing an example of denim fabric subjected to a through-the-back pre-treatment on the back side and striped patterning treatment on the dyed warp side of the fabric.

As a variation of the color washout technique, the back side of the denim fabric can be subjected to pre-treatment using a higher gauge (e.g., 61) jet strip which causes the surface of the indigo warp yarn on the dyed warp side to fill in and darken with color. Stripes later produced by jet treatment using a lower gauge jet strip on the dyed warp side are contrasted more distinctly against the darker color fabric. Striped patterning in the case of indigo cotton denim dyed with sulfur overdye showed an even more pronounced enhancement of surface bulk and darkening of color. For through-the-back pre-treatment, a jet strip with too high a gauge and too small an orifice diameter may not deliver enough impact energy for overall color washout. For example, a 61-gauge 0.005-inch strip produced better results than 104-gauge 0.0034-inch strips. Also, multiple manifolds may be used to obtain an even overall color washout. A photograph of a sample of indigo cotton denim pre-treated on the back side with nine 61-gauge 0.005-inch strips and then striped on the dyed warp side with a 12-gauge 0.011-inch strip at 100 fpm is shown in FIG. 7.

Figure 8:
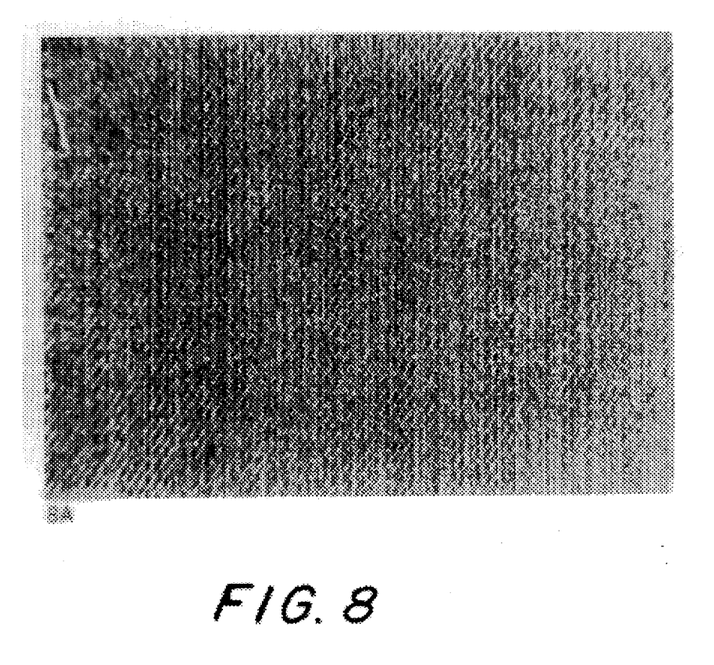
FIG. 8 is a photograph showing an example of denim fabric subjected to striped patterning treatment to produce a background strié striping.

As another variation of striped patterning, a combination of jet strips with large and small orifice diameters and/or different gauges operated at higher line speeds and/or lower pressures may be used to produce a randomized background striping effect in denim called "strié". For example, a line speed of about 155 fpm and pressure of 500 to 750 psi may be used. A jet strip combination may have orifice diameters smaller than that preferred for regular striping, for example, in the range of 0.005 to 0.009 inch. The jet strip combination gauge may have different gauges, for example, two strips having 12 and 18 gauge, and may be provided with randomized narrow/wide spacings between orifices for a more interesting effect. In FIG. 8, a photograph shows a sample of indigo cotton denim striped with a strié effect using a randomized (20–40 gauge) strip with 0.005 orifice diameter at 750 psi pressure followed by a 12-gauge strip with 0.011-inch diameters and an 18-gauge strip with 0.009-inch orifice diameters, both operated at 500 psi and and 155 fpm line speed.

The striped patterning station may be operated as a separate treatment module or incorporated at any suitable point in a conventional fabric finishing range. Typically, a denim finishing range can include singeing the fabric to remove excess fiber hairs, dip padding to apply compressive shrinking lubricant, can drying to about 20–25% moisture level, tenter drying, then completing the compressive shrinkage of the denim fabric. The padding with lubricant may instead be done after can drying. Since the denim fabric in a loom state is rather stiff, the fabric may be desized initially by wetting, steaming, and washing one or more times to remove sizing from the fabric. Most preferably, the striped patterning station is interposed before the padding with lubricant.

Figure 5:
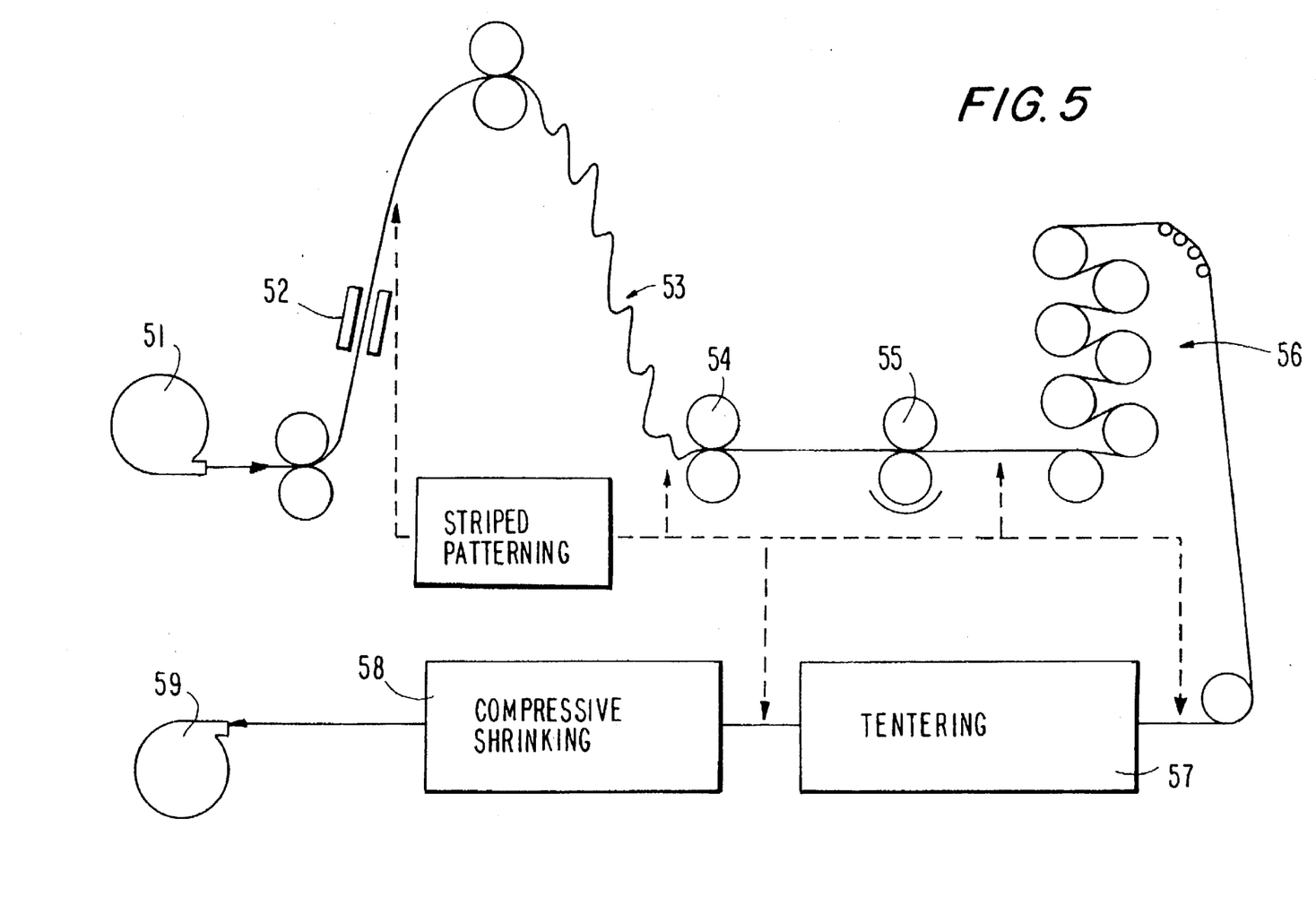
FIG. 5 illustrates the striped patterning station included in a denim finishing range.

In FIG. 5, an example of a typical denim finishing range is shown. Griege fabric is unwound from a large supply roll (from the weave room) as indicated at block 51. The fabric passes through a heated singer 52 to remove surface fiber hairs, and is fed via a scray 53 to allow some accumulation to accommodate variations in tension or the run from the supply rolls. The fabric then passes through nip rolls 54 which apply a positive grip on the fabric and stretches it in conjunction with pulling through the pad rolls 55 adding lubricant to the fabric. Steam cans 56 and tenter drying section 57 are used to partially dry the fabric and set a desired fabric width. The compressive shrinking (Sanforizing™) machine 58 compacts the denim so that there is little apparent shrinkage in the finished garment. The winder 59 re-rolls the finished fabric for shipment to the customer.

The striped patterning station may be interposed at any suitable point in the denim finishing range, as indicated by the dashed/solid arrows. Other fluid or drying treatments in the denim finishing range do not appear to adversely affect the quality and durability of striping. As a preferred position, the striped patterning station is positioned anywhere before lubricant or softening agents are added to the fabric at the padding station 55.

While the foregoing description has referred to certain preferred embodiments and illustrative examples of the invention, other variations, fabrics, and process parameters may be devised given the principles disclosed. The described subject matter and all such variations are considered to be within the spirit and scope of the invention as defined in the appended claims.

The invention is claimed:

1. A method for striped patterning of dyed fabric comprising the steps of:

conveying a continuous length of dyed fabric of a predetermined width on a support member in a machine direction at a selected line speed;

providing at least one hydrojet manifold over the fabric conveyed on the support member, said manifold having at least one row of hydrojet orifices extending in a cross direction across the width of the dyed fabric, said orifices having a selected gauge and diameter and emitting columnar streams of fluid generated at a selected manifold pressure downwardly onto a facing side of the fabric conveyed on the support member;

impacting the facing side of the fabric with the columnar streams of fluid while conveying it on the support member in the machine direction, said orifice gauge and diameter, manifold pressure, and line speed being selected such that a desired striped patterning is formed on the facing side of the fabric by color washout of dye; and drying and finishing the fabric.

2. A method for striped patterning of dyed fabric according to claim 1, wherein the fabric is dyed denim, and the orifice gauge is selected to be in the range of 1 to 18 orifices/inch.

3. A method for striped patterning of dyed fabric according to claim 1, wherein the fabric is dyed denim, and the orifice diameter is selected to be in the range of 0.005 to 0.013 inch.

4. A method for striped patterning of dyed fabric according to claim 1, wherein the fabric is dyed denim, and the manifold pressure is selected to be in the range of 1750 to 2200 psi.

5. A method for striped patterning of dyed fabric according to claim 1, wherein the fabric is dyed denim, and the line speed is selected to be in the range of 50 to 150 fpm.

6. A method for striped patterning of dyed fabric according to claim 1, wherein multiple manifolds are arranged in parallel in sequence along the machine direction.

7. A method for striped patterning of dyed fabric according to claim 1, wherein said manifold has multiple rows of hydrojet orifices.

8. A method for striped patterning of dyed fabric according to claim 1, wherein the fabric is dyed denim, further comprising an initial step of pre-treating a back side of the denim fabric opposite its dyed warp side by hydrojet treatment for overall color washout to enhance the surface bulk and darkening of color on the dyed warp side.

9. A method for striped patterning of dyed fabric according to claim 1, wherein the fabric is dyed denim, and a combination of jet strips having different diameters and gauges is used to obtain a background strié striping effect in the dyed denim.

10. A method for striped patterning of dyed fabric according to claim 1, wherein said hydrojet manifold is arranged at a striped patterning station which is integrated in a denim finishing range.

11. An apparatus for striped patterning of dyed fabric comprising:

means for conveying a continuous length of dyed fabric of a predetermined width on a support member in a machine direction at a selected line speed;

at least one hydrojet manifold mounted above the fabric conveyed on the support member, said manifold having at least one row of hydrojet orifices extending in a cross direction across the width of the dyed fabric, said orifices having a selected gauge and diameter and emitting columnar streams of fluid generated under a selected manifold pressure downwardly onto a facing side of the fabric conveyed on the support member;

wherein said orifice gauge and diameter, manifold pressure, and line speed are selected such that a desired striped patterning extending in the machine direction is formed on the facing side of the fabric by color washout of dye.

12. An apparatus for striped patterning of dyed fabric according to claim 11, wherein the fabric is dyed denim, and the orifice gauge is selected to be in the range of 1 to 18 orifices/inch.

13. An apparatus for striped patterning of dyed fabric according to claim 11, wherein the fabric is dyed denim, and the orifice diameter is selected to be in the range of 0.005 to 0.013 inch.

14. An apparatus for striped patterning of dyed fabric according to claim 11, wherein the fabric is dyed denim, and the manifold pressure is selected to be in the range of 1750 to 2200 psi.

15. An apparatus for striped patterning of dyed fabric according to claim 11, wherein the fabric is dyed denim, and the line speed is selected to be in the range of 50 to 150 fpm.

16. An apparatus for striped patterning of dyed fabric according to claim 11, wherein multiple manifolds are arranged in parallel in sequence along the machine direction.

17. An apparatus for striped patterning of dyed fabric according to claim 11, wherein said hydrojet manifold has multiple rows of hydrojet orifices.

18. An apparatus for striped patterning of dyed fabric according to claim 11, wherein said jet strip is removably interchangeable in a common hydrojet manifold structure.

19. An apparatus for striped patterning of dyed fabric according to claim 11, wherein said hydrojet manifold is arranged at a striped patterning station which is integrated in a denim finishing range.

20. A dyed denim fabric product made by the process of claim 1.

* * * * *